UNITED STATES PATENT OFFICE.

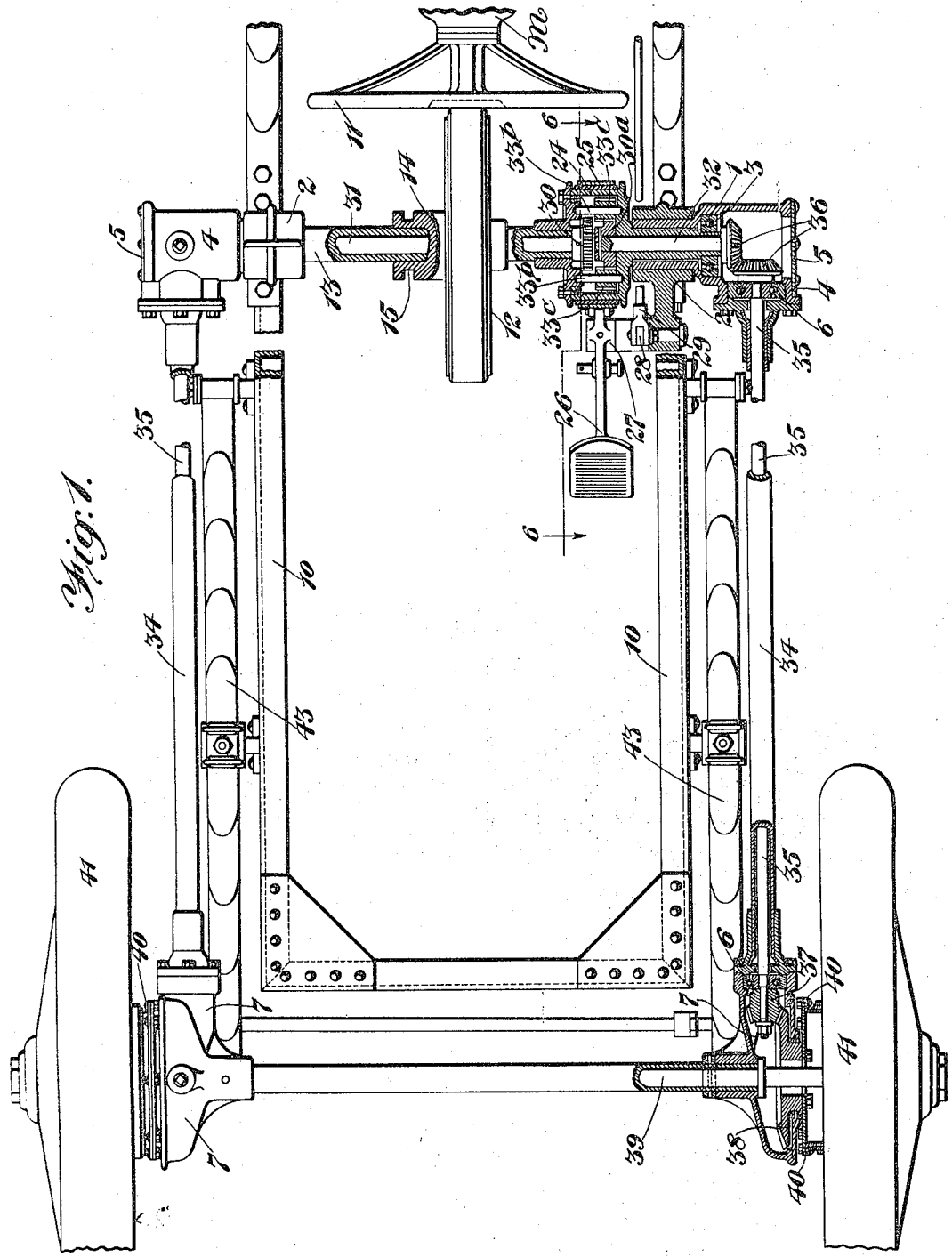

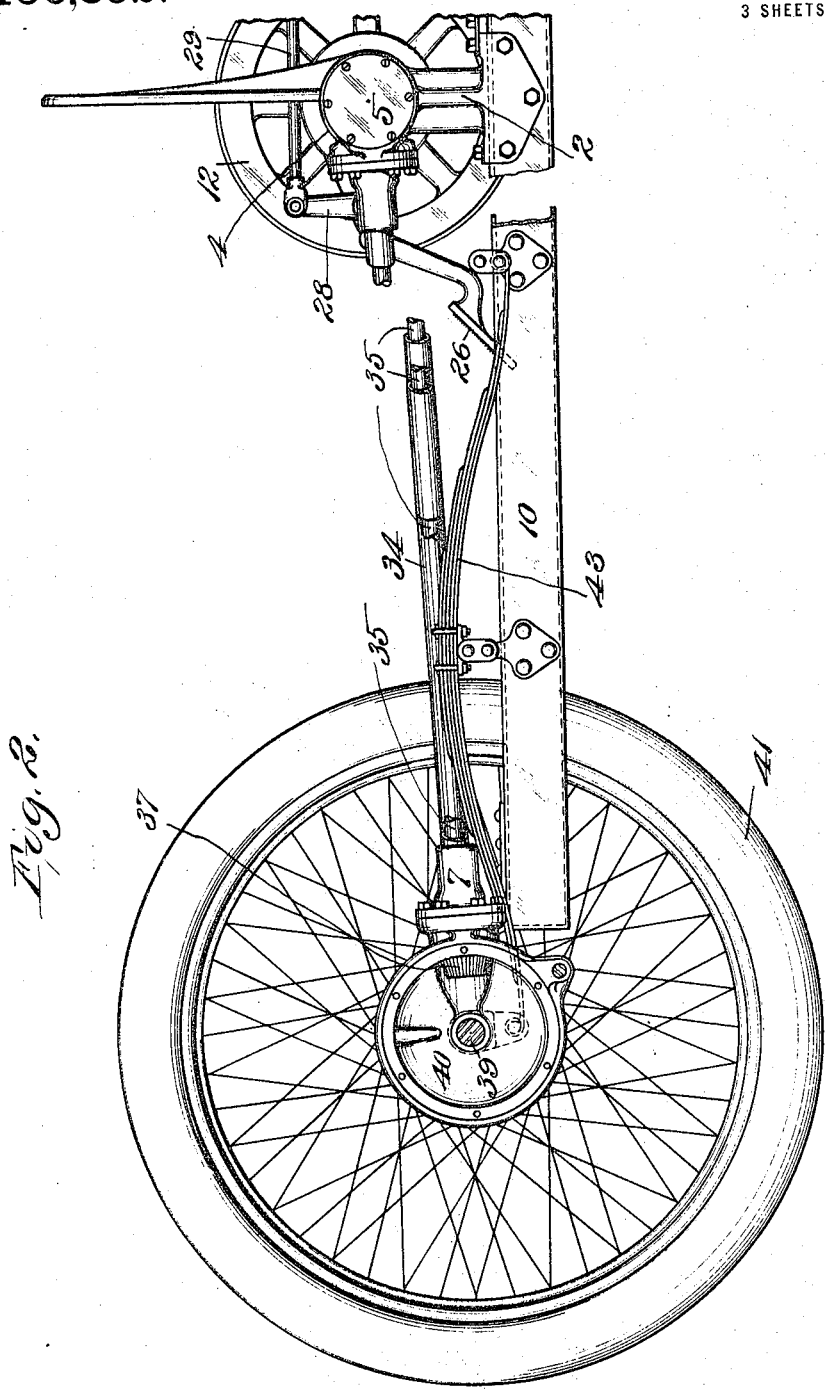

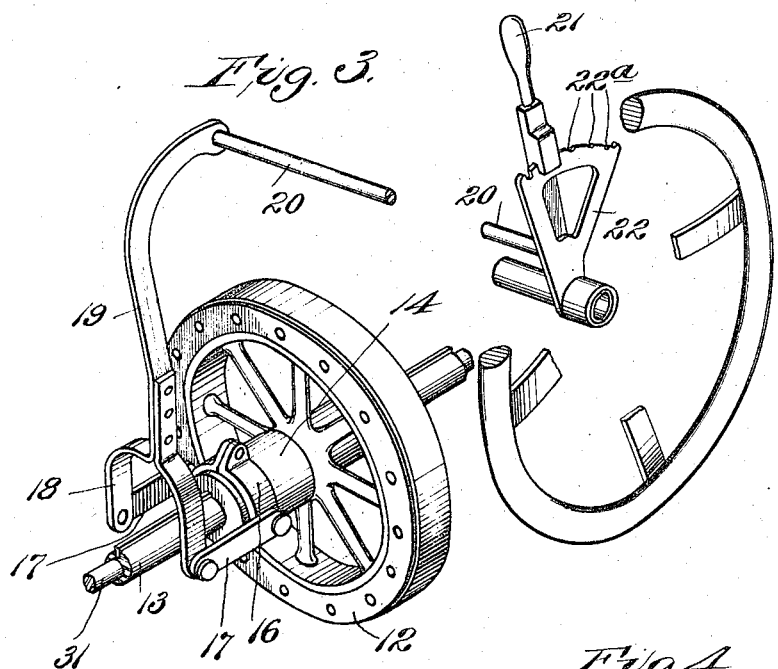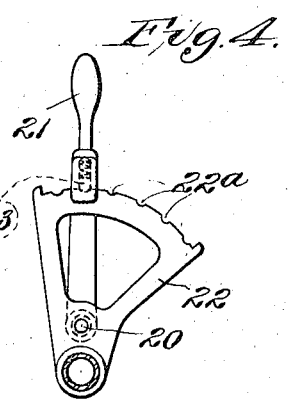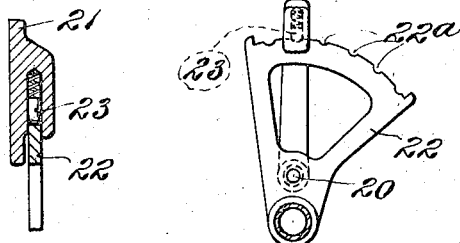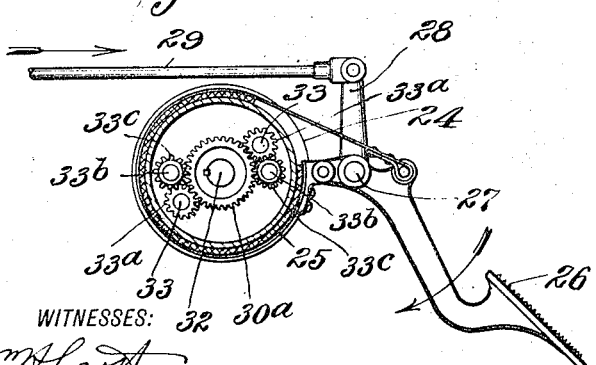

THOMAS G. VAN SANT, OF POPLAR BLUFF, MISSOURI, ASSIGNOR OF ONE-HALF TO SAMUEL G. DORMAN, OF POPLAR BLUFF, MISSOURI.

POWER-TRANSMISSION MECHANISM.

1,156,852.  Specification of Letters Patent.  Patented Oct. 12, 1915.

Application filed June 27, 1914. Serial No. 847,752.

*To all whom it may concern:*

Be it known that I, THOMAS G. VAN SANT, a citizen of the United States, residing at the city of Poplar Bluff, in the county of Butler and State of Missouri, have invented a new and useful Power-Transmission Mechanism, of which the following is a specification.

This invention relates to power transmission mechanism particularly adapted for use in motor vehicles, and consists in the novel arrangement and combination of parts hereafter more fully disclosed.

An object of the invention is to provide an efficient power transmission mechanism so located and arranged with respect to the chassis of a motor vehicle as to permit the suspension of the chassis in such a manner that the center of gravity of the vehicle will be relatively much lower than the motor vehicles of the usual type.

Another object of the invention is to provide a transmission mechanism in which the power transmission shafts are supported above the frame of the vehicle, thus avoiding any underhanging mechanism, and thereby permitting the mounting of the frame of the vehicle at a relatively lower position than in motor vehicles of the usual type wherein the power transmission shafts are hung below the frame of the vehicle.

Another object of the invention is to provide a power transmission mechanism in which the power is transmitted directly to each of the rear wheels of the vehicle independently journaled on a rigid rear axle, thereby producing a structure which possesses the advantages of durability and simplicity and the parts of which may be economically produced and assembled.

Another object of the invention is to provide a construction whereby the propelling force of the driven rear wheels is transmitted by rigid elements to the forward part of the vehicle.

Another object of the invention is to provide a power transmission mechanism including friction driving elements, in combination with efficient mechanism for varying the relative position of the friction driving elements to control the speed and direction of rotation of the driven vehicle wheels.

Other valuable features and advantages resulting from and attainable by the present invention will be obvious to those skilled in the art to which this invention relates without specific mention, from the following detailed disclosures thereof, taken in connection with the accompanying drawings, in which—

Figure 1 is a plan view of the chassis of a motor vehicle together with the mechanism of the present invention and its associated parts. Fig. 2 is a side elevation of the vehicle frame embodying the power transmission mechanism of the present invention, certain of the parts being broken away. Fig. 3 is a broken perspective view of one of the friction driving elements together with the associated controlling mechanism therefor. Fig. 4 is a detailed view illustrating the device for controlling the adjustable friction driving element, showing particularly the handle for operating said controlling device, together with its associated segment. Fig. 5 is a detailed view illustrating the details of construction of the locking pawl for the handle of the controlling device illustrated in Fig. 4, and Fig. 6 is a detail sectional view taken substantially on the line 6—6 of Fig. 1, illustrating the brake and the differential gear mechanism.

In the preferred embodiment of the invention, which I have illustrated in the drawings, the chassis of the vehicle is indicated by 10, in the front part of which is supported a motor M of any desired type for driving a friction disk 11. A coöperating friction wheel 12 is carried by a tubular transmission shaft 13. The shaft 13 is supported transversely of the chassis of the vehicle in bearings 1 which are supported by brackets 2 carried by and extending upwardly from the chassis. Anti-friction devices 3 are provided between the bearings 1 and the shaft 13 at the points of bearing, permitting the shaft 13 to rotate freely within its journals. The friction wheel 12 is splined or feathered on the shaft 13, permitting lateral movement of said wheel, longitudinally on said shaft across the face of the friction disk 11, whereby the speed and direction of rotation of the shaft 13 may be controlled optionally and at the will of the operator.

The friction disk 11 which is driven from the motor M is movable into and out of contact with the friction wheel 12 by a mechanism which constitutes no part of the present invention, but which constitutes the subject-matter of a copending application Serial No. 847,754 filed by me on the 27th day of June, 1914.

I provide means for manually moving the friction wheel 12 on the shaft 13 and locking the same in selected coöperating positions with respect to the friction disk 11. This mechanism as I have illustrated it in the accompanying drawings comprises an extended hub 14 formed integral with the friction wheel 12 in which hub is provided a circumferential groove 15. A collar 16 embraces said hub and is seated in said groove. Links 17 connect the collar 16 with the bifurcated yoke 18. The yoke 18 has an upwardly extending curved arm 19 connected at its free end with a rock shaft 20. The rock shaft 20 is so journaled that it may be rocked in either direction, thereby moving the friction wheel 12 through the connections just described in either direction across the face of the friction disk 11. The rock shaft is arranged to extend parallel with the steering column of the vehicle and is surmounted by a handle 21 by means of which it may be manually rocked in either direction by the operator.

Arranged in coöperative relationship with the handle 21 is a segment 22 secured to the rigid steering column and adjacent the steering wheel on the steering post. The outer edge of the segment 22 is provided with a series of notches 22ª, which are adapted to coöperate with a spring actuated locking bolt 23 mounted in the handle 21. The locking bolt 22 together with the notches 22ª constitute adjustable locking means whereby the rock shaft 20 may be locked in a series of adjustments for holding the friction wheel 12 in selected coöperative positions with respect to the friction disk 11. It will be observed that the mechanism just described provides convenient means for controlling the speed and direction of rotation of the shaft 13 optionally and at the will of the operator and for locking the friction driving elements in selected adjustments.

The tubular shaft 13 carries a drum or casing 24. A strap 25 controlled by a foot lever 26 pivoted on the stud 27 is arranged in coöperative relationship with the drum 24, constituting a band brake for the shaft 13. The foot lever 26 is also provided with an arm 28 to which is pivoted a rod 29 adapted through associated mechanism (not shown herein, but clearly disclosed in the copending application hereinbefore referred to) for determining the position of the friction disk 11 and its associated mechanism with respect to the friction wheel 12. It is sufficient to say for purposes of present disclosure that when the foot lever 26 is depressed, as indicated by the arrow in Fig. 6, the rod 29 is pulled backwardly as indicated by the arrow in said figure sufficiently to move the friction disk 11 out of contact with the friction wheel 12, after which the strap 25 is drawn about the drum 24 thereby locking the shaft 13 against rotation. Thus, it will be seen that the adjustment of the parts associated with the foot lever 26 is such that the brake will be applied to the shaft 13 after the transmission mechanism has been disconnected from the source of power.

The drum 24 also constitutes a casing for a differential gear mechanism, which I will now describe. There are two shafts 31 and 32 which are independently revoluble and which are arranged end to end, the abutting ends extending into said drum. A gear 30 is secured on the shaft 31 within the drum or casing 24, and a similar gear 30ª is secured upon the shaft 32 within said drum or casing and at a slight distance from the gear 30. Two short shafts 33 are mounted in the drum or casing 24 parallel with the shafts 31 and 32. A pinion 33ª is mounted on each of said shafts 33 and mesh with the gear 30 on the shaft 31, but do not mesh with the gear 30ª which is on the shaft 32. Two other short shafts 33ᵇ, similar to the shafts 33, are also mounted in the drum or casing 24 and support two pinions 33ᶜ. The two pinions 33ᶜ mesh with the gear 30ª which is on the shaft 32, but do not mesh with the gear 30 which is on the shaft 31. The pinions 33ª mesh with the pinions 33ᶜ, respectively, thus constituting a differential gear mechanism composed of spur gears, which operate as a lock so that the shafts 31 and 32 may be driven by the shaft 13 in either direction and at the same speed. If, however, the rotation of either of the shafts 31 or 32 is retarded in making a turn, the other of said shafts may be driven at a different or greater relative speed.

The shafts 31 and 32 are mounted within the tubular shaft 13 and are axially alined and extend respectively to each side of the frame of the vehicle. At each side of the frame of the vehicle a tubular casing 34 is provided, which casings are disposed longitudinally of and in a plane above said frame. Within each of said casings is a shaft 35 which terminate at their forward ends adjacent to the outer ends of the shafts 31 and 32, respectively, one of said shafts 35 having gear connection 36 with the shaft 31 and the other of said shafts 35 having gear connection 36 with the shaft 32. The rear end of each shaft 35 is equipped with a beveled pinion 37. The pinions 37 mesh with and drive the gears 38 which are attached to hubs 40 of the independently rotatable rear wheels 41. Thus, since the shafts 31 and 32 are capable of rotation independently at different speeds, because of the arrangement and operation of the differential gear mechanism heretofore described, it is obvious that the independently driven wheels 41 may also rotate at different speeds. This construction permits the rear wheels 41 to rotate at the required ratio of speed at the time the vehicle is turned, or when it departs from the straight line of travel, so that the outer wheel will revolve at a greater speed than the inner wheel, preventing slipping of either of the wheels.

The gears 36 are incased in housings 4 having extended tubular portions journaled in bearings in the brackets 2, which housings are provided with removable caps 5 whereby access to the gears may be readily obtained. Anti-friction devices 6 are interposed between the ends of the shafts 35 and the bearings for the same, permitting the said shafts to rotate freely. The housings 7 are provided for the pinions 37 and 38.

The rear portion of the frame 10 is supported by the springs 43 the rear extremities of which are connected to the axle member 39, and the forward portion of each of which is connected to said frame 10 at a number of points, as will be understood by reference to Figs. 1 and 2. By this construction the casings 34 constitute thrust members for transmitting the propelling force to the forward part of the vehicle frame, and the frame is permitted to vibrate so as to enable the springs 43 to function properly, because of the fact that the housings 4 are journaled in bearings in the brackets.

This construction, it will be observed, provides for the transmission of the propelling force imparted to the rear axle by the driven rear wheels 41 through the members 34 to a point forward of the frame, namely the point where the members 34 are rigidly connected to the frame through the housings 4 and the brackets 2. This construction results in driving the vehicle from the forward part of the frame. This forward drive of the vehicle is of great advantage as it results in actuating the vehicle from a point forward of the main weight, thus to a large extent eliminating the strain due to a rear thrust. This construction, permitting as it does the application of the propelling force to the forward part of the vehicle, also enables the vehicle to be controlled with greater facility as the point of propelling force is nearer to the front wheels by which the course of the vehicle is controlled. Other obvious advantages result from this construction.

I am aware that various modifications in the construction may be made without departing from the spirit and scope of the invention. I do not limit myself, therefore, to exact details, but

What I claim and desire to secure by Letters Patent, is:—

1. In a motor vehicle, the combination of a hollow shaft, bearings in which said shaft is journaled, two shafts journaled in and wholly supported by said hollow shaft, a gear on each of said last-named shafts, a support on said hollow shaft adjacent to said gears, two pinions carried by said support meshing with the gear on one of said shafts, two additional pinions carried by said support meshing with the gear on the other of said shafts, bearings adjacent to the outer ends of said two shafts, transmission shafts journaled in said bearings, and gearing for revolving said transmission shafts by said two shafts.

2. In a motor vehicle, the combination of a frame, bearings on said frame, a hollow shaft journaled in said bearings, two shafts journaled in said hollow shaft, a gear on each of said two shafts, a casing on said hollow shaft inclosing said gears, two short shafts in said casing, pinions supported by said two short shafts meshing with the gear on one of said first-named two shafts, two additional short shafts in said casing, pinions on said last-named short shafts meshing with the gear on the other of said first-named two shafts, a bearing at the outer end of each of said first-named two shafts, a transmission shaft journaled in each of said last-named bearings, and gearing for revolving said transmission shafts by said two shafts.

3. In a motor vehicle, the combination with the chassis, of bearing members attached to the chassis near the forward end thereof, a tubular shaft journaled in said bearing members transversely of the chassis, two axially alined shafts within said tubular shaft, means for revolving said tubular shaft, differential gear mechanism for driving said two shafts from said tubular shaft, driving connections between said two shafts and the rear wheels of the vehicle, casings in which said connections are supported, and connections between said casings and said bearing members whereby the entire propelling force applied to the rear wheels is imparted to the chassis adjacent to the ends of said two shafts and said tubular shaft.

4. In a motor vehicle, the combination with the chassis, the rear axle, and springs for supporting the rear portion of said chassis upon said rear axle, of a tubular shaft supported transversely of the chassis adjacent to the forward end thereof, two axially alined shafts within said tubular shaft, means for revolving said tubular shaft, differential gear mechanism for driving said two shafts from said tubular shaft, driving connections between said two shafts and the rear wheels of the vehicle, casings in which said connections are supported, connections between said casings and the rear axle, and connections between said casings and the chassis adjacent to the outer ends of said two shafts and said tubular shaft whereby the entire propelling force applied to the rear wheels is imparted to the chassis adjacent to the ends of said shafts.

5. In a motor vehicle, the combination with the rear wheels, the axle for the rear wheels, the chassis, and springs supporting said chassis upon said axle, of bearings near the forward end of said chassis, housing members journaled in said bearings, a tubular shaft journaled in said housing members, two shafts journaled in said tubular shaft and having their ends extending into said housing members, differential gear mechanism for driving said two shafts from said tubular shaft, casings connecting said rear axle with said housing members whereby the propelling force imparted to the rear wheels is transmitted to the forward portion of said chassis, shafts mounted in said casings, and gear mechanism for driving said last-named shafts and thereby the rear wheels from said two shafts.

6. In a motor vehicle, the combination with the rear wheels, the axle for the rear wheels, the chassis, and springs connected to said axle and supporting said chassis, of casing members having their rear ends connected to said axle, housing members pivotally connecting the ends of said casing to the forward portion of said chassis, a tubular shaft journaled in said housing members, shafts mounted in said tubular shaft and extending into said housing members, means for driving said last-named shafts from said tubular shaft, and shafts journaled in said casings and driven by said last-named shafts for rotating the rear wheels.

7. In a motor vehicle, the combination of a hollow shaft, two shafts journaled in said hollow shaft, a gear on each of said last-named shafts, a casing on said hollow shaft inclosing said gears, two pinions supported within said casing meshing with the gear on one of said shafts, two additional pinions in said casing meshing with the gear on the other of said shafts, a support at the outer end of each of said two shafts, shafts journaled in said supports, and gearing for revolving said last-named shafts by said two shafts.

8. In a motor vehicle, the combination with the chassis, of a tubular shaft supported transversely of the chassis adjacent to the forward end thereof, two axially alined shafts within said tubular shaft, means for revolving said tubular shaft, differential gear mechanism between said tubular shaft and said two shafts, driving connections between said two shafts and the rear wheels of the vehicle, casing in which said connections are supported, and connections between said casings and the chassis whereby the entire propelling force applied to the rear wheels is imparted to the chassis adjacent to the ends of said two shafts.

9. In a motor vehicle, the combination with the rear wheels, the axle for the rear wheels, the chassis, and springs connected to said axle and supporting said chassis, of bearings near the forward end of said chassis, housing members journaled in said bearings, a drive shaft journaled in said housing members, casings connected said rear axle with said housing members whereby the propelling force imparted to the rear wheels is transmitted to the forward portion of said chassis, shafts mounted in said casings, gear connections whereby said last-named shafts will rotate said rear wheels, and gearing for driving said last-named shafts from said drive shaft.

10. In a motor vehicle, the combination with the rear wheels, the axle for the rear wheels, the chassis, and springs connected to said axle and supporting said chassis, of casings connected to said axle and extending toward the forward end of said chassis, devices pivotally connecting the forward ends of said casings to the forward portion of said chassis whereby the chassis may vibrate with said springs and whereby the propelling force of said wheels is transmitted to the forward portion of the chassis, a drive shaft adjacent to said pivotal connecting devices, shafts mounted in said casings and driven by said drive shaft, and gearing whereby said last-named shafts will rotate said wheels.

11. In a motor vehicle, the combination with a chassis, driven shafts supported transversely of the chassis adjacent to one end thereof, said shafts being axially alined, bearings on the upper part of said chassis adjacent to one end thereof, members journaled in said bearings, tubular casings having their forward ends connected to said members and extending parallel with the side members of the chassis and having their rear ends connected to the rear axle of the vehicle, transmission shafts mounted in said casings and having their rear ends geared to the rear wheels of the vehicle, respectively, and having their forward ends geared to said driven shafts, a tubular shaft incasing said driven shafts, means for driving said tubular shaft, gear connections between said tubular shaft and said driven shafts, and means for varying the speed and direction of rotation of said tubular shaft.

12. In a motor vehicle, the combination with a chassis, a rear axle, springs connected to said axle and supporting said chassis, bearings mounted near the forward end of said chassis, housings journaled in said bearings, and casings connected to said rear axle and to said housings whereby the propelling force of the rear wheels is transmitted to the forward portion of said chassis, a tubular shaft journaled in said housings, shafts journaled in said tubular shaft and extending into said housings beyond said tubular shaft, mechanism for revolving said last-named shafts by said tubular shaft, transmission shafts journaled in said casings, means for driving said transmission shafts by said second-named shafts, and gearing for driving the rear wheels of the vehicle by said transmission shafts.

In witness whereof, I have signed this specification in the presence of two subscribing witnesses.

THOMAS G. VAN SANT.

Witnesses:
W. S. RANDALL,
A. L. VAUGHAN.